United States Patent
Lee et al.

(10) Patent No.: US 8,161,341 B2
(45) Date of Patent: Apr. 17, 2012

(54) METHOD OF TRANSMITTING CONTROL INFORMATION IN WIRELESS COMMUNICATION SYSTEM AND TRANSMISSION WINDOW UPDATING METHOD USING THE SAME

(75) Inventors: Young Dae Lee, Gyeonggi-do (KR); Sung Duck Chun, Gyeonggi-do (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 959 days.

(21) Appl. No.: 11/913,544

(22) PCT Filed: May 2, 2006

(86) PCT No.: PCT/KR2006/001654
§ 371 (c)(1),
(2), (4) Date: Jul. 1, 2008

(87) PCT Pub. No.: WO2006/118418
PCT Pub. Date: Nov. 9, 2006

(65) Prior Publication Data
US 2008/0294958 A1    Nov. 27, 2008

(30) Foreign Application Priority Data
May 4, 2005    (KR) .................. 10-2005-0037539
May 6, 2005    (KR) .................. 10-2005-0037951

(51) Int. Cl.
*G08C 25/02*    (2006.01)
(52) U.S. Cl. ........ 714/748; 714/749; 714/750; 714/751; 370/349; 370/449; 370/231; 370/236; 370/394; 370/468; 370/473; 370/469
(58) Field of Classification Search .............. None
See application file for complete search history.

(56) References Cited

U.S. PATENT DOCUMENTS
2002/0097809 A1 *   7/2002   Jiang ...................... 375/295
(Continued)

FOREIGN PATENT DOCUMENTS
CN         1496157         5/2004
(Continued)

OTHER PUBLICATIONS
3GPP TS 25.322 V4.12.0 (Jun. 2004), 3rd Generation Partnership Project; Technical Specification Group Radio Access Network; Radio Link Control (RLC) protocol specification (Release 4), http://www.3gpp.org/ftp/Specs/html-info/25322.htm.*

(Continued)

*Primary Examiner* — Scott Baderman
*Assistant Examiner* — Justin R Knapp
(74) *Attorney, Agent, or Firm* — Lee, Hong, Degerman, Kang & Waimey

(57) ABSTRACT

A method of transmitting control information in a wireless communication system and transmission window updating method using the same are disclosed, by which transmission efficiency in a transmitting side can be enhanced. The present invention includes the steps of receiving a first control information block including a first status report information from a receiving side, the first status information providing reception acknowledge information for a plurality of data blocks transmitted to the receiving side, receiving a second control information block including a second status report information placed as a last status report information in the second control information block, and updating the transmission window using the reception acknowledge information in the first status report information.

6 Claims, 10 Drawing Sheets

U.S. PATENT DOCUMENTS

| | | | |
|---|---|---|---|
| 2004/0047331 A1* | 3/2004 | Jang | 370/346 |
| 2004/0153852 A1* | 8/2004 | Wu | 714/43 |
| 2004/0235447 A1 | 11/2004 | Gronberg et al. | |
| 2005/0041585 A1* | 2/2005 | Jiang | 370/236 |
| 2005/0041586 A1* | 2/2005 | Jiang | 370/236 |
| 2006/0067238 A1* | 3/2006 | Olsson et al. | 370/242 |
| 2006/0245430 A1* | 11/2006 | Jiang | 370/394 |
| 2008/0261583 A1* | 10/2008 | Yi et al. | 455/422.1 |
| 2008/0316965 A1* | 12/2008 | Lotter et al. | 370/329 |

FOREIGN PATENT DOCUMENTS

| | | |
|---|---|---|
| EP | 1594328 A1 | 11/2005 |
| JP | 2003174470 | 6/2003 |
| JP | 2004158916 | 6/2004 |
| JP | 2005045642 | 2/2005 |
| JP | 2005-073251 | 3/2005 |
| KR | 10-2003-0062868 | 7/2003 |
| KR | 10-2003-0066356 | 8/2003 |
| KR | 10-2004-0022780 | 3/2004 |
| WO | 95/35616 | 12/1995 |
| WO | 00/49761 | 8/2000 |
| WO | 03/005644 | 1/2003 |
| WO | WO 2003-105435 A1 | 12/2003 |
| WO | 2004/073346 | 8/2004 |
| WO | WO 2004-073346 | 8/2004 |
| WO | WO 2004-086785 A2 | 10/2004 |

OTHER PUBLICATIONS

Hua Xu et al.: "Performance analysis on the radio link control protocol of UMTS system"; Vehicular Technology Conference, 2002. Proceedings. VTC 2002—Fall. 2002 IEEE 56th.

* cited by examiner

FIG. 4
--Prior Art--

| D/C | PDU type | SUFI₁ | Oct1 |
|---|---|---|---|
| SUFI₁ ||| Oct2 |
| . . . ||| . |
| SUFI_K ||| . |
| PAD ||| OctN |

FIG. 5
--Prior Art--

| R2 | PDU type | SUFI₁ | Oct1 |
|---|---|---|---|
| SUFI₁ ||| Oct2 |
| . . . ||| . |
| SUFI_K ||| . |
| PAD ||| OctN |

FIG. 6
--Prior Art--

| D/C | PDU Type | RSN | R1 | Oct1 |
|---|---|---|---|---|
| HFNI ||||  |
| HFNI |||| |
| HFNI | | | | |
| PAD |||| OctN |

FIG. 7
--Prior Art--

| Type= NO_MORE |
|---|

FIG. 8
--Prior Art--

| Type= BITMAP |
|---|
| LENGTH |
| FSN |
| Bitmap |

FIG. 9
--Prior Art--

| Type= ACK |
|---|
| LSN |

FIG. 11

| D/C | PDU type | BITMAP×1 | Oct1 |
|---|---|---|---|
| BITMAP×1 | | | Oct2 |
| . . . | | | · · · |
| NO MORE | | | |
| PAD | | | OctN |

FIG. 12

| D/C | PDU type | BITMAP×2 | Oct1 |
|---|---|---|---|
| BITMAP×2 | | | Oct2 |
| . . . | | | |
| ACK (LSN=SN of first error bit in status PDU) | | | · · · |
| PAD | | | OctN |

FIG. 13

| |
|---|
| Type = BITMAPx |
| LENGTH |
| FSN |
| Bitmap |
| LSN |

FIG. 14

| D/C | PDU type | BITMAPx | Oct1 |
|---|---|---|---|
| BITMAPx | | | Oct2 |
| . . . | | | · |
| BITMAPx(LSN) | | | · |
| PAD | | | OctN |

FIG. 15

| D/C | PDU type | BITMAP | Oct1 |
|---|---|---|---|
| BITMAP | | | Oct2 |
| BITMAPx | | | · |
| BITMAPx(LSN) | | | · |
| PAD | | | OctN |

FIG. 16

| D/C | PDU type | BITMAP | Oct1 |
|---|---|---|---|
| BITMAP ||| Oct2 |
| . . . ||| . |
| NO MORE ||| . |
| PAD ||| OctN |

FIG. 17

| D/C | PDU type | BITMAPx | Oct1 |
|---|---|---|---|
| BITMAPx ||| Oct2 |
| . . . ||| . |
| BITMAPx(LSN) ||| . |
| PAD ||| OctN |

METHOD OF TRANSMITTING CONTROL INFORMATION IN WIRELESS COMMUNICATION SYSTEM AND TRANSMISSION WINDOW UPDATING METHOD USING THE SAME

CROSS-REFERENCE TO RELATED APPLICATIONS

This application is a national stage application of International Application No. PCT/KR2006/001654, filed on May 2, 2006, which claims the benefit of earlier filing date and right of priority to Korean Application No. 10-2005-0037951, filed on May 6, 2005, and Korean Application No. 10-2005-0037539, filed on May 4, 2005.

TECHNICAL FIELD

The present invention relates to a wireless communication system, and more particularly, to a method of transmitting control information in a wireless communication system and transmission window updating method using the same.

BACKGROUND ART

FIG. 1 is a block diagram of a network structure of UMTS (universal mobile telecommunications system).

Referring to FIG. 1, a universal mobile telecommunications system (hereinafter abbreviated UMTS) mainly includes a user equipment (hereinafter abbreviated UE), a UMTS terrestrial radio access network (hereinafter abbreviated UTRAN) and a core network (hereinafter abbreviated CN).

The UTRAN includes at least one radio network sub-system (hereinafter abbreviated RNS). And, the RNS includes one radio network controller (hereinafter abbreviated RNC) and at least one base station (hereinafter called Node B) managed by the RNC. And, at least one or more cells exist in one Node B.

FIG. 2 is a diagram of architecture of UMTS radio protocol.

Referring to FIG. 2, radio protocol layers exist as pairs in both UE and UTRAN to take charge of data transmission in radio section.

The respective radio protocol layers are explained as follows.

First of all, a PHY layer as a first layer plays a role in transferring data to a radio section using various radio transfer techniques. In the PHY layer, a reliable data PHY layer of a radio section is connected to a MAC layer as an upper layer via a transport channel. And, the transport channel is mainly classified into a dedicated transport channel and a common transport channel according to whether a channel is shared or not.

A second layer includes MAC, RLC, PDCP and BMC layers. First of all, a MAC layer plays a role in mapping various logical channels to various transport channels, respectively and also performs a function of logical channel multiplexing that plays a role in, mapping various logical channels to one transport channel. The MAC layer is connected to an RLC layer of an upper layer via a logical channel.

And, the logical channel is mainly divided into a control channel for transferring information of a control plane and a traffic channel for transferring information of a user plane according to a type of information that is transferred.

Meanwhile, the MAC layer can be divided into MAC-b sublayer, MAC-d sublayer, MAC-c/sh sublayer and MAC-e sublayer according to types of transport channels managed in detail.

The MAC-b layer takes charge of a management of a transport channel BCH (broadcast channel) responsible for a broadcast of system information. The MAC-c/sh layer manages a shared transport channel, which is shared by other UEs, such as FACH (forward access channel), DSCH (downlink shared channel) and the like. The MAC-d sublayer takes charge of a management of a dedicated transport channel DCH (dedicated channel) for a specific UE. The MAC-hs sublayer manages a transport channel HS-DSCH (high speed downlink shared channel) for high speed data transfer to support the high speed data transfer in downlink and uplink. And, the MAC-e sublayer manages a transport channel E-DCH (enhanced dedicated channel) for uplink data transfer.

A radio link control (hereinafter abbreviated 'RLC') layer takes charge of guarantee of quality of service (hereinafter abbreviated 'QoS') of each radio bearer and also takes charge of a transfer of corresponding data. The RLC leaves one independent RLC entity at each RB to guarantee intrinsic QoS of RB. The RLC offers three kinds of RLC modes such as transparent mode (hereinafter abbreviated 'TM'), unacknowledged mode (hereinafter abbreviated 'UM') and acknowledged mode (hereinafter abbreviated 'AM') to support various QoS. And, the RLC plays a role in adjusting a data size to enable a lower layer to transfer data to a radio section. For this, the RLC plays a role in segmenting and concatenating data received from an upper layer.

A PDCP layer is placed above the RLC layer and plays a role in transferring data transferred using IP packet such as IPv4 or IPv6 efficiently in a radio section having a relatively small bandwidth. For this, the PDCP layer performs a header compression function, by which information mandatory for a header of data is transferred to raise transport efficiency in a radio section. Since header compression is a basic function of the PDCP layer, the PDCP layer exists in a packet service domain (hereinafter abbreviated 'PS domain') only. And, one PDCP entity exists for each RB to provide an effective header compression function to each PS service.

In the second layer, a BMC (broadcast/multicast control) layer is provided above the RLC layer. The BMC layer schedules a cell broadcast message and performs broadcasting to UEs located in a specific cell.

A radio resource control (hereinafter abbreviated 'RRC') layer located in a lowest part of a third layer is defined by a control plane only. The RRC layer controls parameters of the first and second layers to be associated with establishment, re-configuration and release of RBs and takes charge of controlling logical, transport and physical channels. In this case, the RB means a logical path provided by the first and second layers of a radio protocol for data transfer between UE and UTRAN. And, RB establishment means a process of regulating characteristics of a radio protocol layer and channel to offer a specific service and establishing specific parameters and operational methods.

The RLC layer is explained in detail as follows.

First of all, basic functions of the RLC layer are QoS guarantee of each RB and a corresponding data transfer. Since an RB service is a service that the second layer provides to an upper layer, the entire second layer has influence on QoS. And, influence of RLC is the greatest. The RLC leaves an independent RLC entity at each RB to guarantee the intrinsic QoS of RB and offers three kinds of RLC modes of TM, UM and AM. Since the three RLC modes differ from one another in the supported QoS, their operational methods are different from one another as well as their detailed functions. So, the RLC needs to be looked into according to its operational mode.

TM RLC is a mode that any overhead is not attached to RLC service data unit (hereinafter abbreviated 'SDU') delivered from a higher layer in configuring RLC protocol data unit (hereinafter abbreviated 'PDU'). In particular, since RLC transmits SDU transparently, it is called TM RLC. Due to such characteristics, TM RLC plays the following roles in user and control planes as follows. In the user plane, since data processing time within RLC is short, TM RLC performs real-time circuit data transfer such as voice or streaming in a circuit service domain (hereinafter abbreviated 'CS domain'). Meanwhile, in the control plane, since there is no overhead within RLC, RLC takes charge of transmission of RRC message from an unspecific UE in case of uplink or transmission of RRC messages broadcast from all UEs within a cell in case of downlink.

Unlike the transparent mode, a mode of adding an overhead in RLC is called a non-transparent mode which is classified into an unacknowledged mode (UM) having no acknowledgement for the transmitted data and an acknowledged mode (AM) having acknowledgement for the transmitted data. By attaching a PDU header including a sequence number (hereinafter abbreviated 'SN') to each PDU, UM RLC enables a receiving side to know which PDU is lost in the course of transmission.

Owing to this function, the UM RLC mainly performs transmission of real-time packet data such as broadcast/multicast data transmission, voice of PS domain (e.g., VoIP) and streaming in user plane or transmission of RRC message needing no acknowledgement among RRC messages transmitted to a specific UE or specific UE group within a cell in control plane.

AM RLC as one of the non-transparent modes configures PDU by attaching a PDU header including SN like UM RLC. Yet, the AM RLC differs from the UM RLC in that a receiving side makes acknowledgement to PDU transmitted by a transmitting side. The reason why the receiving side makes acknowledgement in the AM RLC is because the transmitting side can make a request for retransmission of PDU failing to be received by the transmitting side it self. And, this retransmission function is the most outstanding feature of the AM RLC. So, the object of the AM RLC is to guarantee error-free data transmission through retransmission. Owing to this object, the AM RLC mainly takes charge of transmission of non-real-time packet data such as TCP/IP of PS domain in user plane or transmission of an acknowledgement-mandatory RRC message among RRC messages transmitted to a specific UE within a cell in control plane.

In aspect of directionality, TM or UM RLC is used for uni-directional communications, whereas AM RLC is used for bi-directional communications due to feedback from a receiving side. Since the bi-directional communications are mainly used for point-to-point communications, AM RLC uses a dedicated logical channel only. There exists a difference in structural aspect as follows. One RLC entity includes a transmission or reception structure in TM or UM RLC, whereas a transmitting side and a receiving side exists within one RLC entity in AM RLC.

The complexity of AM RLC is attributed to the retransmission function. The AM RLC includes a retransmission buffer for retransmission management as well as a transmitting/receiving buffer and performs various functions of use of a transmitting/receiving window for flow control, polling that a transmitting side requests status information from a receiving side of a peer RLC entity, a status report that a receiving side reports its buffer status to a transmitting side of a peer RLC entity, status PDU for carrying status information, piggyback of inserting status PDU in data PDU to raise data transfer efficiency and the like.

Meanwhile, there is a reset PDU making a request for resetting of all operations and parameters to an AM RLC entity of the other side in case that an AM RLC entity discovers a critical error in the course of operation. And, there is also a reset Ack PDU used for a response to the reset PDU. To support these functions, AM RLC needs various protocol parameters, status variables and timer. PDU used for data transfer control in status information report, status PDU, reset PDU or the like is called control PDU and PDU used for delivery of user data is called data PDU.

In brief, PDUs used by AM RLC can be mainly classified into two types. A first type is data PDU and a second type is control PDU. And, the control PDU includes status PDU, piggybacked status PDU, reset PDU and reset Ack PDU.

One of the cases of using control PDU is a reset procedure. The reset procedure is used in solving the error situation in operation of AM RLC. For instance of the error situation, sequence numbers mutually used are different from each other or PDU or SDU fails in transmissions amounting to a count limit. Through the reset procedure, AM RLC of a receiving side and AM RLC of a transmitting side reset environmental variables and then re-enter a status enabling communications.

The reset procedure is explained as follows.

First of all, a side having decided to initiate a reset procedure, i.e., AM RLC of a transmitting side includes a currently used transmitting direction hyper frame number (hereinafter abbreviated 'HFN') value in reset PDU and then transmits the reset PDU to a receiving side. AM RLC of the receiving side having received the reset PDU re-establishes an HFN value of its receiving direction and then resets environmental variables such as a sequence number and the like. Subsequently, the AM RLC of the receiving side includes its transmitting direction HFN in reset Ack PDU and then transmits the reset Ack PDU to the AM RLC of the transmitting side. If receiving the reset Ack PDU, the AM RLC of the transmitting side re-established its receiving direction HFN value and then resets environmental variables.

A structure of RLC PDU used by AM RLC entity is explained as follows.

FIG. 3 is a structural diagram of AM RLC PDU.

Referring to FIG. 3, AM RLC PDU is used when AM RLC entity attempts to transmit user data or piggybacked status information and polling bit. A user data part is configured as an 8-bit integer multiplication and a header of AM RLC PDU is constructed with a 2-octet sequence number. And, a header part of AM RLC PDU includes a length indicator.

FIG. 4 is a structural diagram of status PDU.

Referring to FIG. 4, status PDU includes different types of SUFIs (super fields). A size of the status PDU is variable but is limited to a size of a largest RLC PDU of a logical channel carrying the status PDU. In this case, the SUFI plays a role in notifying information indicating what kind of AM RLC PDU arrives at a receiving side or what kind of AM RLC PDU does not arrive at the receiving side, etc. The SUFI is constructed with three parts of a type, a length and a value.

FIG. 5 is a structural diagram of piggybacked status PDU.

Referring to FIG. 5, a structure of a piggybacked status PDU is similar to that of a status PDU but differs in that a D/C filed is replaced by a reserved bit (R2). The piggybacked status PDU is inserted in case that a sufficient space remains in AM RLC PDU. And, a PDU type value can be always fixed to '000'.

FIG. 6 is a structural diagram of reset ACK PDU.

Referring to FIG. 6, a reset PDU includes a sequence number named 1-bit RSN. And, a reset ACK PDU is transmitted in response to a received reset PDU in a manner of including RSN contained in the received reset PDU.

Parameters used for the PDU format are explained as follows.

First of all, a value of 'D/C field' indicates whether a corresponding PDU is a control PDU or a data PDU.

'PDU Type' indicates a type of the control PDU. In particular, 'PDU Type' indicates whether a corresponding PDU is a reset PDU or a status PDU, and the like.

'Sequence Number' value means sequence number information of AM RLC PDU.

Meanwhile, 'Polling Bit' value is set when a request for status report is made to a receiving side.

Extension bit (E)' value indicates whether a next octet is a length indicator or not.

Reserved bit (R1)' value is used for a reset PDU or a reset ACK PDU and is coded as '000'.

'Header Extension Bit (HE)' value indicates whether a next octet is a length indicator or data.

'Length Indicator' value indicates a location of a boundary face if a boundary surface between different SDUs exists within a data part of PDU.

'PAD' part is a padding area and is an area that is not used in AM RLC PDU.

SUFI (Super Field) is explained in detail as follows.

As briefly mentioned in the foregoing description, SUFI plays a role in notifying information, which indicates what kind of AM RLC PDU has arrived at a receiving side or what kind of AM RLC PDU has not arrived at the receiving side and the like, to a transmitting side. Currently, there are eight types of SUFIs defined to use. Each of the SUFIs consists of a type, a length and a value.

And, there exist various SUFI types including NO_MORE (No More Data), WINDOW (Window Size), ACK (Acknowledgement), LIST (List), BITMAP (Bitmap), Rlist (Relative list), MRW (Move Receiving Window), MRW ACK (Move Receiving Window Acknowledgement), etc.

The SUFI types are explained in detail as follows.

(A) NO_MORE SUFI

FIG. 7 is a structural diagram of NO_MORE SUFI field according to a related art.

Referring to FIG. 7, NO_MORE SUFI exists as a type field only. NO_MORE SUFI plays a role in indicating that no more SUFI exists after the NO_MORE SUFI. So, an area following the SUFI can be regarded as PAD (padding) area.

(B) BITMAP SUFI

FIG. 8 is a structural diagram of BITMAP SUFI field according to a related art.

Referring to FIG. 8, BITMAP SUFI consists of a type (Type), a bitmap length (LENGTH), a start sequence number (F SN) and a bitmap (Bitmap).

The LENGTH consists of four bits and (LENGTH+1) means an octet size of the bitmap. For instance, if LENGTH='0000', it means that a bitmap octet size is '1'. Since LENGTH can have set to a value up to '1111', a maximum octet size the bitmap can have becomes '16'.

The FSN consists of twelve bits and means a sequence number corresponding to a first bit of the bitmap.

The Bitmap varies according to a value given by the Length field. Status information of AM RLC PDU corresponding to a sequence number in an interval corresponding to [FSN, FSN+(LENGTH+1)*8−1] can be indicated. In a sequence, a sequence number increases left to right and a reception status of AM RLC PDU is represented as '0' (abnormal reception: NACI) or '1' (normal reception: ACK).

In UE, AM RLC PDUs reported by BITMAP SUFI as correctly received a receiving side can be deleted by a transmitting side.

(C) ACK SUFI

FIG. 9 is a structural diagram of ACK SUFI field according to a related art.

Referring to FIG. 9, ACK SUFI consists of a type (Type) and a last sequence number (LSN).

ACK SUFI plays a role in indicating a last portion of a data part in STATUS PDU like the NO_MORE SUFI. If ACK SUFI exists at a last portion of STATUS PDU, NO_MORE SUFI needs not to exist at the same time. In other words, ACK SUFI should exist in STATUS PDU not ended as NO_MORE SUFI. Portions following the ACK SUFI can be regarded as PAD (padding).

The ACK SUFI takes charge of 'acknowledge' for reception of all AM RLC PDUs each of which is reported errorless in portions prior to a STATUS PDU in case of SN<LSN. In other words, if LSN>VR(R), acknowledgement information for AM RLC PDUs in reception error status should be transmitted as one using one STATUS PDU. In particular, acknowledgement information for AM RLC PDUs in reception error status are unable to be transmitted by being separated into several STATUS PDUs. If LSN=VR(R), AM RLC PDUs in reception error status can be transmitted by being separated into several STATUS PDUs. If LSN<VR(R), it cannot be used. And, a value of LSN can be set to a value equal to or smaller than VR(H). In this case, VR(H) is SN of AM RLC PDU that will arrive after a greatest SN among AM RLC PDUs received by a receiving side. In particular, in case of receiving 'x' having a greatest SN among AM RLC PDUs received by a receiving side, VR(H) becomes (x+1).

A transmitting side having received STATUS PDU can update a value of VT(A) by comparing LSN to SN of AM RLC PDU in a first error reception status included in the STATUS PDU.

If a value of the received LSN is equal to or smaller than the SN of the AM RLC PDU corresponding to a first reception error in STATUS PDU (LSN≦the SN of the first error bit in STATUS PDU), VT(A) is updated into the LSN value.

If a value of the received LSN is greater than the SN of the AM RLC PDU corresponding to a first reception error in STATUS PDU (LSN>the SN of the first error bit in STATUS PDU), VT(A) is updated into a value of SN of the AM RLC PDU corresponding to the first reception error in the STATUS PDU.

VR(R) is SN of AM RLC PDU estimated to be received next to a last AM RLC PDU received in sequence by the receiving side. For instance, if the receiving side receives AM RLC PDUs up to $N^{th}$ AM RLC PDU without reception error, VR(R) is (N+1). And, VT(A) is SN of AM RLC PDU estimated to be received in sequence next to last AM RLC PDU having received ACK (normal reception acknowledgement) information from the receiving side by the transmitting side. For instance, if ACK (normal reception acknowledgement) information for AM RLC PDUs up to the $M^{th}$ is received from the receiving side by the transmitting side, VT(A) is (M+1).

In the related art, if a transmitting side receives a status report, a lower edge of a transmission window is updated with reference to an LSN value included in an ACK SUFI. Namely, in the related art, an AM RLC of a transmitting side is supposed to update a value of VT(A) of a lower edge of the transmission window by comparing the received LSN value to a sequence number (SN) of AM RLC PDU reported as a reception error in status PDU or Piggybacked status PDU for status report.

However, in the related art, a transmitting side is unable to update a transmission window until receiving an ACK SUFI including an LSN value from a receiving side. In case that a status PDU or piggybacked status PDU including an ACK SUFI is not normally received, it is unable to update a transmission window despite recognizing that a receiving side has received AM RLC PDUs without error. Hence, it is unable to efficiently perform data transmission to the receiving side.

DISCLOSURE OF THE INVENTION

Accordingly, the present invention is directed to a method of transmitting control information in a wireless communication system and transmission window updating method using the same that substantially obviate one or more of the problems due to limitations and disadvantages of the related art.

An object of the present invention is to provide a method of transmitting control information in a wireless communication system and transmission window updating method using the same, by which transmission efficiency in a transmitting side can be enhanced.

Another object of the present invention is to provide a method of transmitting control information in a wireless communication system and transmission window updating method using the same, by which if a transmitting side obtains information indicating that a receiving side has received a data block without error, a transmission window of the transmitting side can be immediately updated according to the obtained information.

Another object of the present invention is to provide a method of transmitting control information in a wireless communication system and transmission window updating method using the same, by which a transmission rate of data blocks in a transmitting side can be raised.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

When a transmitting side transmits a plurality of data blocks to a receiving side, the receiving side transmits status report information for a plurality of the received data blocks to the transmitting side. In this case, the status report information includes reception acknowledgement information indicating whether a reception error exists for each of the data blocks. Preferably, the status report information is transmitted by being included in a control information block transmitted to the transmitting side from the receiving side. The receiving side can transmit the status report information for a plurality of the data blocks to the transmitting side by including it in at least two control information blocks. The transmitting side updates a transmission window using the status report information transmitted from the receiving side.

In case that the transmitting side receives the status report information via the at least two control information blocks, if obtaining information (e.g., a sequence number of the data block having a first reception error) for data blocks, which is received by the receiving side without error, from the status report information included in the first control information block, the transmitting side updates the transmission window despite not receiving the second control information block.

Meanwhile, in case that first status report information and second status report information are included in different control information blocks, respectively, the first status report information included in the control information block firstly received by a transmitting side among a plurality of the control information blocks includes information for a first data block firstly received with error in the receiving side. And, the second status report information is included in a control data block transmitted last to the transmitting side.

Meanwhile, a transmitting side obtains information for a first data block having a reception error from first status report information included in a control data block firstly received among a plurality of control data blocks received by the transmitting side. In case of failing to normally receive the firstly received control data block, the transmitting side obtains the information for the first data-block having the reception error from second status report information included in the control data block received last among the received control data blocks.

The data block means a data unit including user data used in a specific protocol layer. For instance, the data block corresponds to a PDU (protocol data unit) in an RLC layer. The control information block means a data unit including control information used in a specific protocol layer. For instance, the control information block corresponds to a status PDU, a piggybacked status PDU or the like. And, the status report information is a status report indicator included in the control information block. For instance, the status report information corresponds to various kinds of SUFIs (super fields) included in the status PDU or the piggybacked status PDU.

To achieve these and other advantages and in accordance with the purpose of the present invention, as embodied and broadly described, a method of updating a transmission window in a mobile communication system according to the present invention includes the steps of receiving a first control information block including a first status report information from a receiving side, the first status information providing reception acknowledge information for a plurality of data blocks transmitted to the receiving side, receiving a second control information block including a second status report information placed as a last status report information in the second control information block, and updating the transmission window using the reception acknowledge information in the first status report information.

Preferably, the second status report information includes a field indicating a sequence number of a data block having a first reception error among a plurality of the data blocks received by the receiving side.

Preferably, a lower edge of the transmission window is updated with a sequence number of a data block corresponding to a first NACK information of the reception acknowledge information in the first status report information.

Preferably, the first status report information is a bitmap type super field (SUFI).

Preferably, the second status report information is an ACK type super field (SUFI).

To further achieve these and other advantages and in accordance with the purpose of the present invention, a method of updating a transmission window in a mobile communication system includes the steps of receiving a first control information block including a first status report information from a receiving side, the first status information providing reception acknowledge information for a plurality of data blocks transmitted to the receiving side, and updating the transmission window using the reception acknowledge information in the first status report information.

Preferably, a lower edge of the transmission window is updated with a sequence number of a data block corresponding to a first NACK information of the reception acknowledge information in the first status report information.

To further achieve these and other advantages and in accordance with the purpose of the present invention, a method of transmitting control information blocks to a transmitting side to provide status report information on data blocks transmitted by the transmitting side includes the steps of transmitting a first control information block including a first status report information to the transmitting side, the first status information providing reception acknowledge information for a plurality of data blocks transmitted by the transmitting side and transmitting a second control information block including a second status report information placed as a last status report information in the second control information block, the second status report information including a field indicating a sequence number corresponding to a lower edge of a receiving window.

To further achieve these and other advantages and in accordance with the purpose of the present invention, a transmitter for updating a transmission window in a mobile communication system includes a means for receiving a first control information block including a first status report information from a receiving side, the first status information providing reception acknowledge information for a plurality of data blocks transmitted to the receiving side, a means for receiving a second control information block including a second status report information placed as a last status report information in the second control information block, and a means for updating the transmission window using the reception acknowledge information in the first status report information.

Preferably, the second status report information includes a field indicating a sequence number of a data block having a first reception error among a plurality of the data blocks received by the receiving side.

Preferably, a lower edge of the transmission window is updated with a sequence number of a data block corresponding to a first NACK information of the reception acknowledge information in the first status report information.

To further achieve these and other advantages and in accordance with the purpose of the present invention, a data structure of a status report indicator is included in a control information block for providing reception acknowledge information for a plurality of data blocks transmitted to a receiving side and the status report indicator includes a first field indicating a type of the status report indicator, a second field providing the reception acknowledge information for a plurality of the data blocks transmitted to the receiving side, and a third field indicating a sequence number equal to or greater than a lower edge of a receiving window used in the receiving side.

Preferably, the third field is a last sequence number (LSN) indicating a sequence number of a data block having a first reception error among a plurality of the data blocks received in the receiving side.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constituted a part of this specification, illustrate embodiments of the invention and together with the description serve to explain the principles of the invention.

In the drawings:

FIG. 4 is a structural diagram of status PDU according to related art;

FIG. 5 is a structural diagram of piggybacked status PDU according to a related art;

FIG. 6 is a structural diagram of Reset ACK PDU according to a related art;

FIG. 7 is a structural diagram of NO_MORE SUFI field according to a related art;

FIG. 8 is a structural diagram of BITMAP SUFI according to a related art;

FIG. 9 is a structural diagram of ACK SUFI according to a related art;

FIG. 11 and FIG. 12 are diagrams of data formats of first and second status PDUs transmitted for a status report to a transmitting side from a receiving side according to one preferred embodiment of the present invention, respectively;

FIG. 13 is a diagram of a data format of BITMAP extended SUFI (BITMAPx SUFI) according to one preferred embodiment of the present invention; and FIGS. 14 to 17 are diagrams for explaining a process of performing a status report to from a receiving side to a transmitting side using BITMAP extended SUFI (BITMAPx SUFI) according to one preferred embodiment of the present invention.

BEST MODE FOR CARRYING OUT THE INVENTION

Reference will now be made in detail to the preferred embodiments of the present invention, examples of which are illustrated in the accompanying drawings.

In the following embodiments of the present invention, the technical features of the present invention are applied to Universal Mobile Telecommunications System (UMTS).

Figure 1:
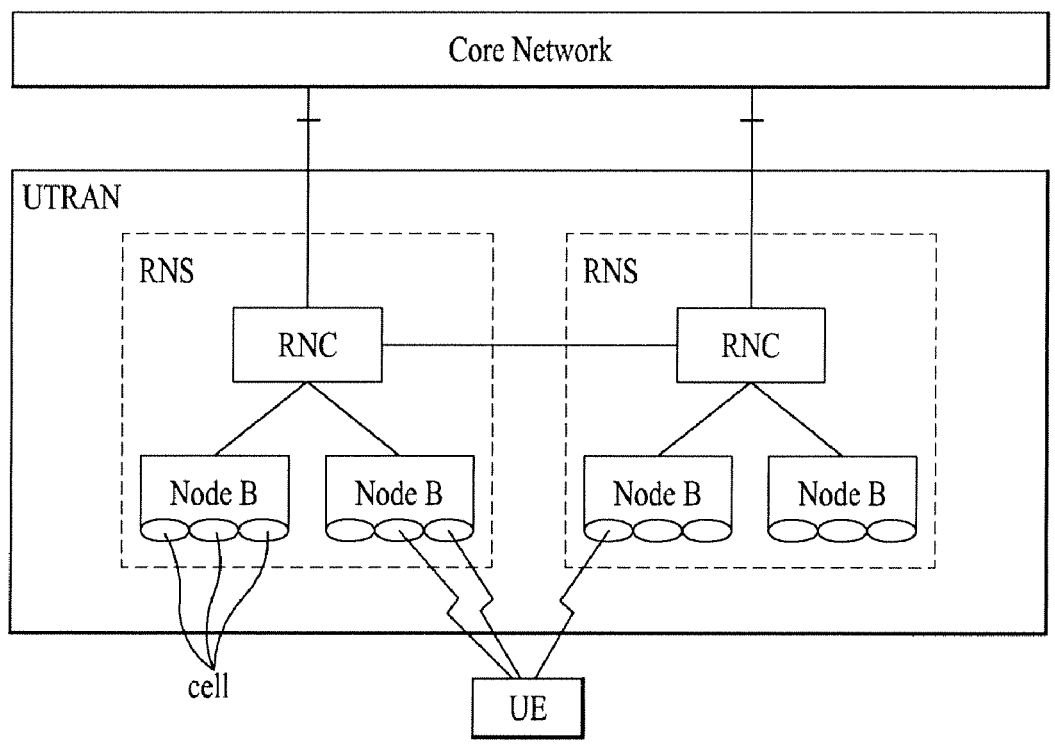
FIG. 1 is a block diagram of a network structure of UMTS (universal mobile telecommunications system) according to a related art.
Figure 2:
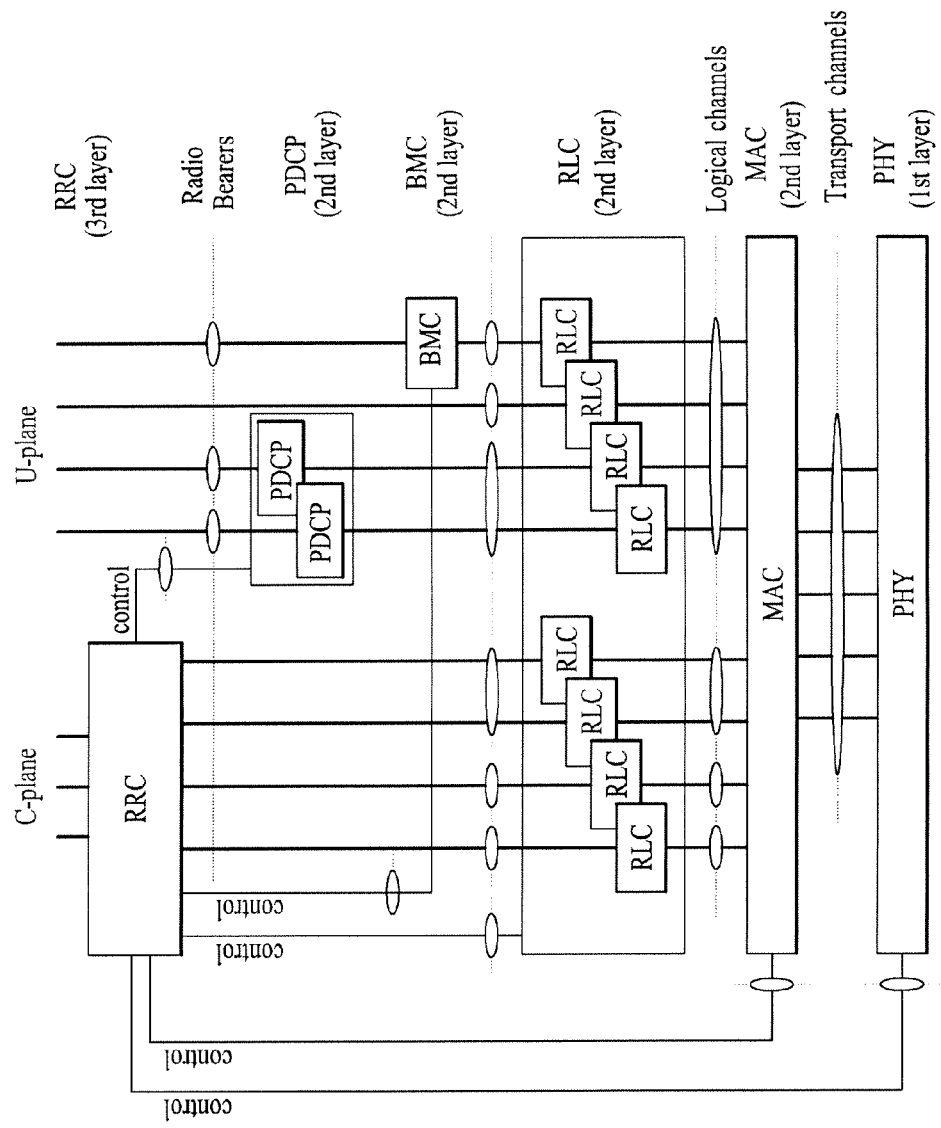
FIG. 2 is a diagram of architecture of UMTS radio protocol according to a related art.
Figure 3:
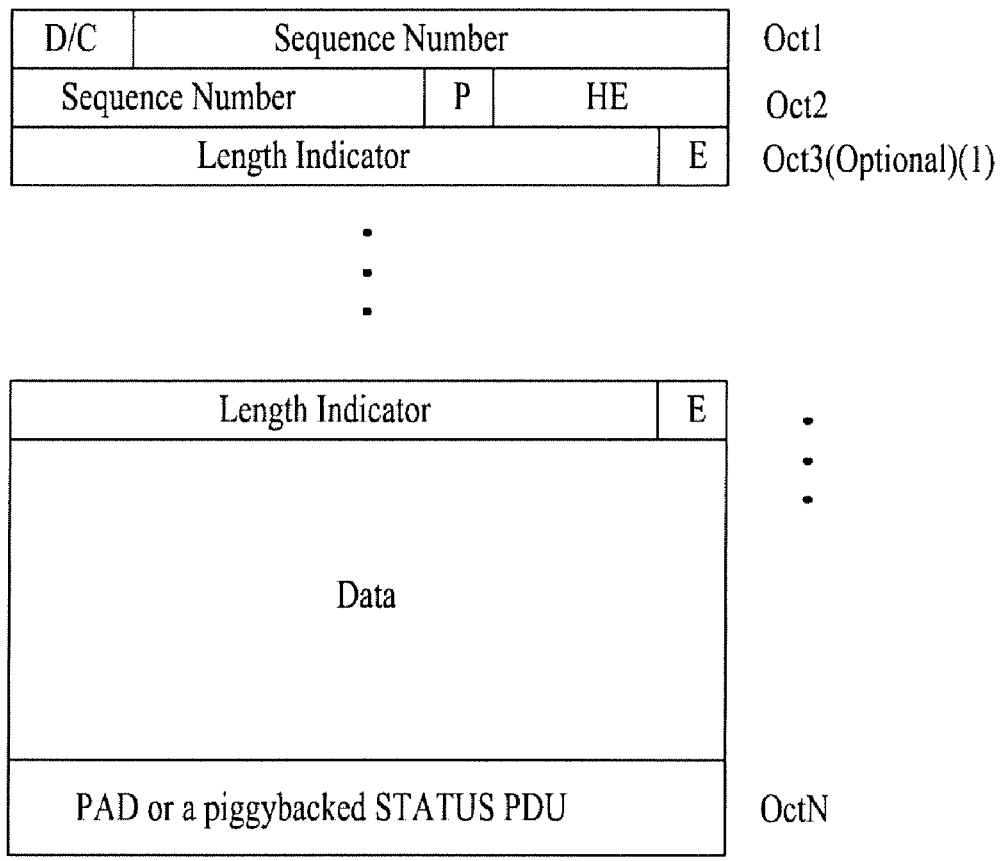
FIG. 3 is a structural diagram of AM RLC PDU according to a related art.
Figure 10:
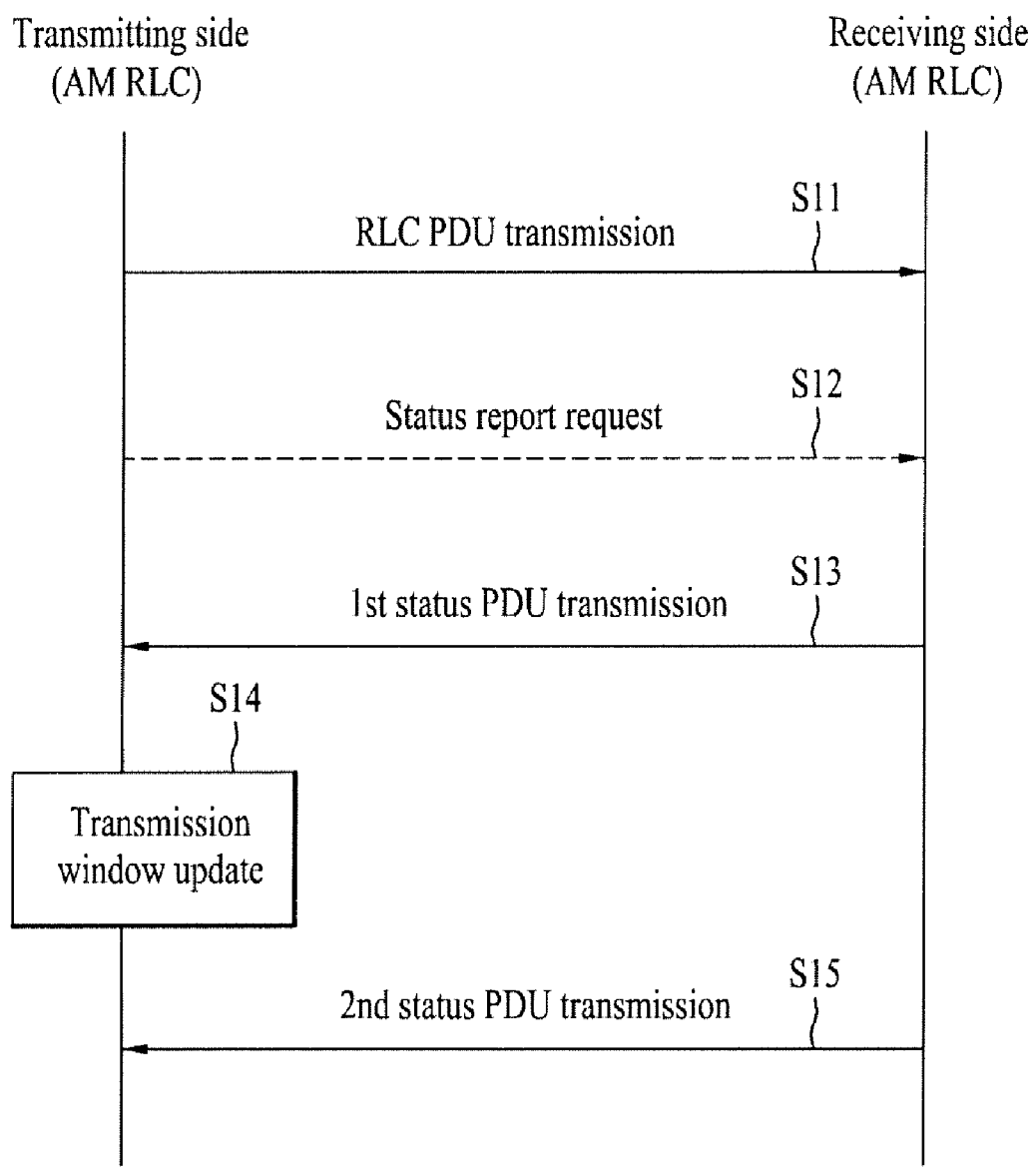
FIG. 10 is a flowchart according to one preferred embodiment of the present invention.

FIG. 10 is a flowchart according to one preferred embodiment of the present invention.

Referring to FIG. 10, a transmitting side transmits a plurality of RLC PDUs (protocol data units) to a receiving side [S11]. The transmitting side can make a request for request status report information to the receiving side if necessary [S12]. In case of receiving the status report information request from the transmitting side or deciding that it is necessary, the receiving side configures status PDU or piggybacked status PDU for a status report and then transmits the configured PDU to the transmitting side periodically or non-periodically.

The receiving side can configure at least one status PDU or piggybacked status PDU for the status report for a plurality of the RLC PDUs having been transmitted from the transmitting side and transmit the configured at least one status PDU or piggybacked status PDU to the transmitting side. In the embodiment shown in FIG. 10, the receiving side makes the status report through two status PDUs or two piggybacked status PDUs (hereinafter named 'status PDU' in general) for reception statuses of sequence numbers (SN) 0 to 99 [S13, S15].

FIG. 11 and FIG. 12 are diagrams of data formats of first and second status PDUs transmitted for a status report to a transmitting side from a receiving side according to one preferred embodiment of the present invention, respectively. Referring to FIG. 11 and FIG. 12, BITMAPx1 SUFI and BITMAXx2 SUFI can indicate reception acknowledgement information, i.e., ACK/NACK information, for PDUs of SN:0 to SN:99 by configuring a bitmap.

For instance, if PDUs having reception error occurrence in the receiving side correspond to SN:30, SN:50, SN:55 and SN:80, respectively, it can be defined that an SN of an AM RLC PDU corresponding to a first reception error is 30 and that an LSN value of an ACK SUFI included in the second status PDU shown in FIG. 12 is '30'. Namely, the LSN value of the ACK SUFI is set not to VR(R) but to an SN value of an RLC PDU corresponding to the first reception error.

The BITMAPx1 includes ACK/NACK information for the PDUs of SN:0~SN:K and the BITMAPx2 includes ACK/NACK information for the PDUs of SN:(K+1)~SN:99. In this case, it is assumed that K is greater than 30.

In case of receiving the first status PDU [S13], the transmitting side can obtain the ACK/NACK information belonging to the range of SN:0 to SN:K from the BITMAPx1 included in the first status PDU. So, the transmitting side can recognize that the PDU of SN:30 corresponds to the first reception error. Hence, the transmitting side immediately updates a transmission window without waiting for a reception of other status PDU [S14].

Namely, in case of recognizing that the PDUs up to the PDU of SN:30 corresponding to the first reception error are normally received in sequence after the status report previously received by the transmitting side, the transmitting side can update a lower edge, i.e., VT(A), of the transmission window. In this example, since the SN corresponding to the first reception error is 30, the VT(A) is updated into 30. And, the SN corresponding to the first reception error is equal to the LSN value set by the receiving side.

If the transmitting side receives the second status PDU [S15], the transmitting side can confirm an LSN value included in an ACK SUFI. Alternatively, it is able to have the ACK SUFI not included in the second status PDU.

In case that a first status PDU or the like is lost in a status report configured with at least three status PDUs, it means that the transmitting side did not sequentially receive ACK/NACK information. So, even if the second status PDU is normally received, VT(A) is not updated into an SN value corresponding to a first error of the second status PDU. In this case, the VT(A) should be updated using an LSN value included in an ACK SUFI by receiving the last status PDU.

The BITMAPx1 can be differentiated from a conventional BITMAP SUFI in order to indicate that the SUFI is configured using an SN of an RLC PDU corresponding to a first reception error in the receiving side. Namely, a new type SUFI having the above usage can be configured. For instance, an LSN can be included in the BITMAPx1. This is explained in detail as follows.

In the related art, a SUFI (e.g., BITMAP, LIST, RLIST SUFI, etc.) indicating ACK/NACK information should be transmitted together with an ACK SUFI through a same or different status PDU. In this case, in case of considering new types of ACK/NACK associated SUFI (e.g., BITMAP, LIST, RLIST SUFI, etc.) having an LSN value instead of the ACK SUFI, the LSN value can be transmitted to the transmitting side without transmitting the ACK SUFI separately.

FIG. 13 is a diagram of a data format of a BITMAP extended SUFI (BITMAPx SUFI) according to one preferred embodiment of the present invention.

Referring to FIG. 13, compared to the related art BITMAP SUFI, BITMAP extended SUFI (BITMAPx SUFI) according to one preferred embodiment of the present invention additionally includes an LSN field.

The LSN field may be configured with 12 bits and can be located between two random fields. In particular, the SUFI can be configured to be placed next to Bitmap field or between any fields including Type & Length, LENGTH & FSN, FSN & Bitmap or the like. In the example shown in FIG. 13, a BITMAP SUFI is used. Alternatively, the LSN field can be added to LIST, RLIST or the like.

FIG. 14 is a diagram for explaining a process of performing a status report from a receiving side to a transmitting side using a BITMAP extended SUFI according to one preferred embodiment of the present invention.

First of all, a receiving side having received a status report request from a transmitting side configures a status PDU for the status report. In the related art, if an LSN value is set to a value greater than a VR(R) value, since ACK/NACK information of a received PDU has to be included in one PDU, one status PDU is configured. FIG. 14 shows an example that a status PDU is configured using a BITMAPx according to one preferred embodiment of the present invention, in which one BITMAPx is used. If several BITMAPs are needed, it is able to configure a last BITMAP using BITMAPx only.

The transmitting side having received the status PDU, as shown in FIG. 14 or FIG. 15, for the status report can obtain ACK/NACK information in a receiving side through a 'BITMAP' field of BITMAPx.

In case of receiving the BITMAP extended SUFI shown in FIG. 14 or FIG. 15, the transmitting side recognizes that the LSN value corresponds to a position next to a position of an octet size indicated by a 'LENGTH' field of the corresponding SUFI. If LENGTH='0001', BITMAP field has a 2-octet size. Hence, 12 bits next to the corresponding bitmap can be recognized as an LSN value.

In case that a position of LSN within BITMAPx is changed, an LSN value can be accurately obtained in a manner that the transmitting side appropriately recognizes a position of the LSN.

The transmitting side having received the BITMAP extended SUFI regards that there exists no more SUFI and that a subsequent position corresponds to PAD.

A new type SUFI according to the present invention is preferably identified by an identity for identifying the corresponding SUFI from other SUFIs. For instance, it is preferable that the BITMAPx SUFI shown in FIG. 13 is defined as a new type to use a new Type ID.

FIG. 16 and FIG. 17 are diagrams for explaining another preferred embodiment of the present invention. If the BITMAPx is clearly discriminated from that of a conventional SUFI and if a transmitting side is able to obtain an LSN value, the SUFI of the present invention can be used for a status report transmitted to the transmitting side by being divided into several status PDUs. In FIG. 16 or FIG. 17, if a status report proceeds by being divided into several status PDUs, a status PDU can be configured without an ACK SUFI using the BITMAPx as a new extended SUFI.

In the above-explained embodiments of the present invention, the technical features of the present invention are applied to the CDMA mobile communication system. And, the technical features of the present invention are applicable to OFDM and OFDMA mobile communication systems and further applicable to any wireless communication system having upper and lower channel structures.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Accordingly, the present invention is applicable to such a wireless communication system as a wireless Internet, a mobile communication system and the like.

What is claimed is:

1. A method of updating a transmission window at a transmitting side in a mobile communication system, the method comprising:
   receiving a first control information block including a bitmap type super field (SUFI) from a receiving side, the bitmap type SUFI providing reception acknowledge information for a plurality of data blocks transmitted to the receiving side;
   updating a lower edge of the transmission window using a sequence number of a data block based on first NACK information of the reception acknowledge information provided by the bitmap type SUFI; and
   receiving a second control information block including an ACK type SUFI placed as a last status report information in the second control information block.

2. The method of claim 1, wherein the ACK type SUFI includes a field indicating the sequence number of the data block.

3. The method of claim 1, wherein receiving the second control information block including the ACK type SUFI is performed after updating the lower edge of the transmission window.

4. A method of updating a transmission window at a transmitting side in a mobile communication system, the method comprising:
   receiving a first control information block including a bitmap type super field (SUFI) from a receiving side, the bitmap type SUFI providing reception acknowledge information for a plurality of data blocks transmitted to the receiving side; and
   updating a lower edge of the transmission window using a sequence number of a data block based on first NACK information of the reception acknowledge information provided by the bitmap type SUFI.

5. A transmitter for updating a transmission window in a mobile communication system, the transmitter comprising:
   means for receiving a first control information block including a bitmap type super field (SUFI) from a receiving side, the bitmap type SUFI providing reception acknowledge information for a plurality of data blocks transmitted to the receiving side;
   means for updating a lower edge of the transmission window using a sequence number of a data block based on first NACK information of the reception acknowledge information provided by the bitmap type SUFI; and
   means for receiving a second control information block including an ACK type SUFI placed as a last status report information in the second control information block.

6. The transmitter of claim 5, wherein the ACK type SUFI includes a field indicating the sequence number of the data block.

* * * * *